(12) United States Patent
Boneberg et al.

(10) Patent No.: US 6,696,188 B1
(45) Date of Patent: Feb. 24, 2004

(54) DEVICE FOR EVAPORATING AND/OR OVERHEATING A HYDROCARBON IN A FUEL CELL

(75) Inventors: Stefan Boneberg, Beuren (DE); Bruno Motzet, Weilheim/Teck (DE); Alois Tischler, Aidenbach (DE); Marc Weisser, Owen/Teck (DE)

(73) Assignee: Ballard Power Systems AG, Kirchheim/Teck-Nabern (DE)

( * ) Notice: Subject to any disclaimer, the term of this patent is extended or adjusted under 35 U.S.C. 154(b) by 0 days.

(21) Appl. No.: 09/890,176

(22) PCT Filed: Jan. 26, 2000

(86) PCT No.: PCT/EP00/00583
§ 371 (c)(1),
(2), (4) Date: Nov. 6, 2001

(87) PCT Pub. No.: WO00/45456
PCT Pub. Date: Aug. 3, 2000

(30) Foreign Application Priority Data

Jan. 27, 1999 (DE) .......................... 199 03 168

(51) Int. Cl.$^7$ .................................................. H01M 8/06
(52) U.S. Cl. ............................................. 429/17; 429/20
(58) Field of Search ............................. 429/17, 20, 34

(56) References Cited

U.S. PATENT DOCUMENTS

| | | | |
|---|---|---|---|
| 4,352,863 A | * | 10/1982 | Maru .......................... 429/17 |
| 4,670,359 A | | 6/1987 | Beshty et al. ................ 429/17 |
| 4,678,723 A | * | 7/1987 | Wertheim ..................... 429/17 |
| 5,741,474 A | | 4/1998 | Manabu et al. |

FOREIGN PATENT DOCUMENTS

| | | |
|---|---|---|
| DE | 197 40 657 | 3/1999 |
| EP | 0 061 727 | 10/1982 |
| EP | 0 729 196 | 2/1995 |
| EP | 0 798 798 | 2/1997 |
| EP | 0 951 087 | 10/1999 |
| FR | A-1 553 361 | 12/1968 |
| FR | 1 553 361 | 1/1969 |
| GB | 2 242 562 | 10/1991 |
| JP | 63 044931 | 2/1988 |
| JP | 06 111841 | 4/1994 |
| WO | WO 99 16139 | 4/1999 |

* cited by examiner

Primary Examiner—John S. Maples
(74) Attorney, Agent, or Firm—Crowell & Moring LLP

(57) ABSTRACT

A device is used to evaporate and/or superheat a hydrocarbon or a hydrocarbon/water mixture for a gas generation system of a fuel cell installation. The hydrocarbon or the hydrocarbon/water mixture flows through a medium-side region of a heat exchanger, which is in thermally conductive communication with a heat-transfer-side region of the heat exchanger. A burner is arranged upstream of the heat-transfer-side region of the heat exchanger, as seen in the direction of flow. An exhaust gas from a combustion which takes place in the burner flows through the heat-transfer-side region of the heat exchanger.

10 Claims, 2 Drawing Sheets

DEVICE FOR EVAPORATING AND/OR OVERHEATING A HYDROCARBON IN A FUEL CELL

BACKGROUND AND SUMMARY OF INVENTION

The invention relates to a device for evaporating and/or superheating a hydrocarbon.

It is known from GB-A-2 242 562, in order to increase the thermal efficiency of the heating of a methanol/water mixture, prior to a reforming reaction, for this mixture to be passed through two heat exchangers arranged in series. These heat exchangers are heated by the exhaust gases from in each case one catalytic burner. One of the heat exchangers is additionally heated by the exhaust gases which flow out of the upstream heat exchanger.

EP 0 184 814 B1 has disclosed a fuel evaporator in which a line which is wound helically around a central combustion chamber is provided for the medium which is to be evaporated. This coil containing the liquids which are to be evaporated is in direct contact with the flame of the burner, resulting in a high thermal load on the components of the evaporator.

DE 196 39 150 C2 has described a central heating device for a gas generation system. In this device, to provide thermal energy an operating medium is catalytically oxidized together with an oxygen-containing gas in a central component. The thermal energy which is generated in the central component is fed to further components of a gas generation system via heat transfer media. On account of the need for the thermal energy to be distributed by a heat-transfer medium to the individual components, corresponding line elements are required, connecting the central burner to the further components on the heat-transfer medium side. Considerable thermal losses may occur in these regions, which have an adverse effect on the overall efficiency of the installation.

EP 0 729 196 A, U.S. Pat. No. 4,670,359, EP 0 798 798 A and FR-A-1 553 361 each disclose systems in which a heat exchanger for heating or evaporating a medium is in each case heated by exhaust gases which are heated from a burner positioned upstream of the heat exchanger, either directly or with various intervening components, such as turbines or the like.

It is an object of the invention to provide a device for evaporating and/or superheating a hydrocarbon or a hydrocarbon/water mixture for a gas generation system of a fuel cell installation in which a heat exchanger is heated as efficiently as possible, which heat exchanger allows a high level of thermal efficiency and is able to react very quickly to changing conditions, such as load changes or the like, on the medium side.

This object is achieved by a device according to the present invention.

By combustion, thermal energy can be produced with a very high level of efficiency. If an exhaust gas from this combustion, which generally includes most of the thermal energy of the combustion, is then passed through the heat-transfer-side region of two heat exchangers, it is possible to provide thermal energy to the heat exchangers with a very high level of efficiency and at the same time to protect the heat exchanger from excessive thermal loading and from chemical loading being imposed on the heat exchanger material as a result of the flames from combustion acting directly on the material. Therefore, the device according to the invention enables a hydrocarbon or a hydrocarbon/water mixture to be evaporated with a very high level of efficiency.

Unlike installations which make use of a heat transfer medium, the device according to the invention has a very good dynamic response, since the thermal energy which is generated in the combustion can very rapidly be adapted to changing conditions. The fact that only the exhaust gas from the combustion flows through the heat exchanger means that time delays which have hitherto arisen as a result of the transfer of the thermal energy from combustion to a heat-transfer medium which then flows through the heat exchanger and on account of the much slower transfer of the thermal energy through the heat-transfer medium, which is generally in liquid form, are avoided.

Further advantages result from the structure of the heat exchanger which, on account of two fluids flowing through it, can be of relatively simple construction. On account of the loading on the material being lower than with direct heating with a flame or a catalytic burner, the heat exchanger can in this case be produced as a simple, for example soldered heat exchanger or evaporator, at low cost.

Moreover, there is no explosive gas mixture produced in the heat exchanger, since in this case only the exhaust gases from a combustion which has already taken place flow through the heat-transfer-side region of the heat exchanger. Therefore, the heat exchanger does not, for safety reasons, have to be designed to withstand these very high pressures which may arise in the event of an explosion, allowing further simplification with regard to production of the heat exchanger and, moreover, allowing the heat exchanger to be constructed with a very low mass. The low mass in turn produces the advantage that the heat exchanger, on account of its lower heat capacity, allows very rapid dynamic response to changing load demands on the fuel cell and therefore changing requirements with regard to the transfer of the thermal energy from the exhaust gas to the hydrocarbon or the hydrocarbon/water mixture.

The device according to the invention therefore offers the advantages of high efficiency with the simultaneous possibility of reacting very rapidly to changing requirements, for example a change in the power demanded from a fuel cell of the fuel cell installation.

By designing the two heat exchangers with different masses and the associated different heat capacities, it is particularly advantageously possible to achieve improved dynamics of the device according to the invention. These improved dynamics are associated with very good cold-start properties of the installation. According to the invention, this results from the mass and therefore the heat capacity of the first heat exchanger being significantly lower than the mass of the second heat exchanger. Consequently, the first heat exchanger can be heated better and more quickly and therefore has a better dynamic response. Naturally, the first heat exchanger, which is generally operated as an evaporator, can therefore also only transfer a lower evaporation capacity, but this is compensated for by the use of the second heat exchanger, so that the overall system remains able to provide a high evaporation capacity which is required.

Advantageous configurations and refinements of the invention will emerge from the exemplary embodiments which are outlined in principle below with reference to the drawings.

DETAILED DESCRIPTION OF THE DRAWINGS

Figure 1:
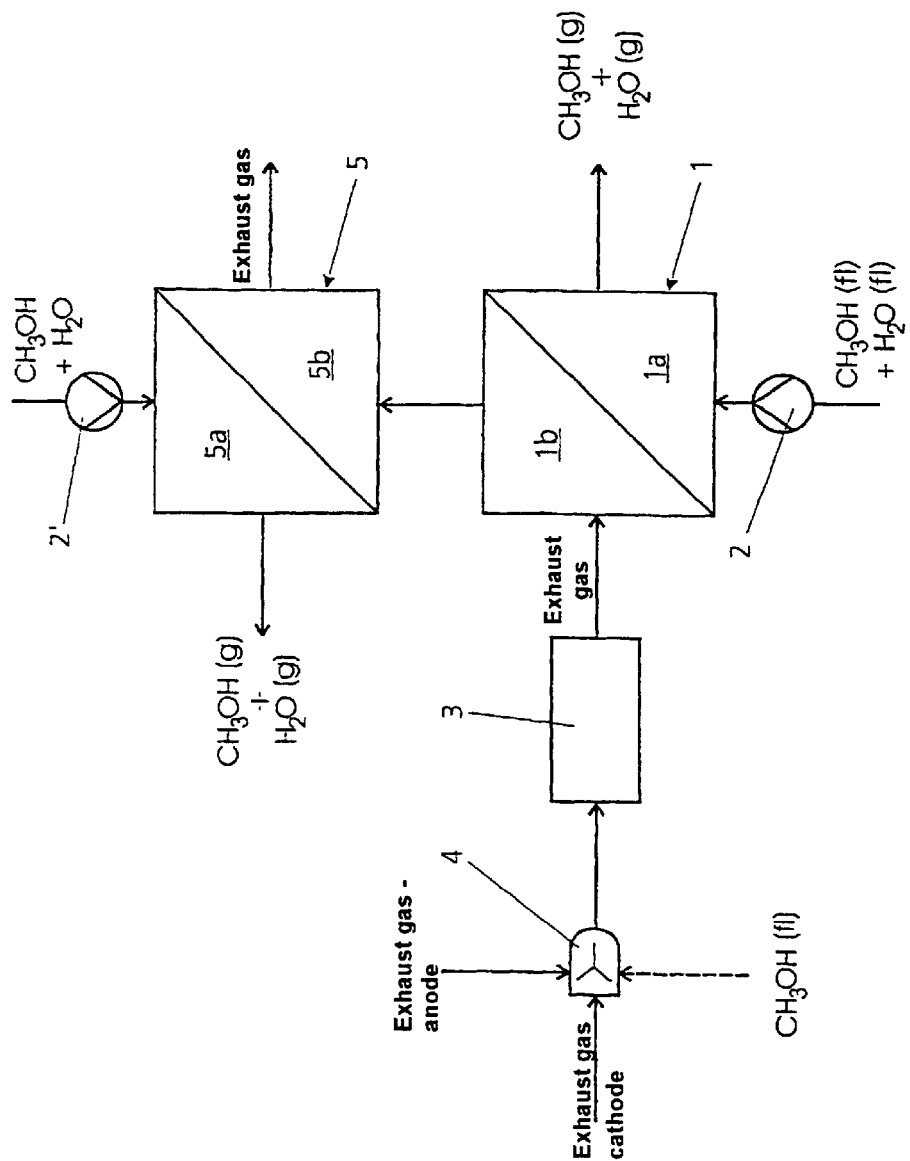
FIG. 1 shows an outline view of a structure of the device according to the invention.

A basic structure of the device for evaporating and/or superheating a hydrocarbon or a hydrocarbon/water mixture is illustrated in FIG. 1. In this structure, a hydrocarbon or a hydrocarbon/water mixture flows through a heat exchanger 1 in its medium-side region 1a. In the exemplary embodiment illustrated here, this medium is in particular to be a mixture of methanol and water ($CH_3OH+H_2O$) The methanol/water mixture is fed to the medium-side region 1a of the heat exchanger 1 in its liquid form via a metering device 2. After the methanol/water mixture has flowed through the medium-side region 1a of the heat exchanger 1, it emerges from the medium-side region 1a of the heat exchanger 1 in the form of heated, evaporated and/or superheated mixture. The methanol/water mixture, which is generally now in gaseous form, can then be fed to the components of a gas generation system, which are not illustrated in further detail, of a fuel cell installation, which is likewise not illustrated in its entirety.

At the same time, a hot exhaust gas from a combustion which takes place in a burner 3 flows through a heat-transfer-side region 1b of the heat exchanger 1. The hot exhaust gas and the methanol/water mixture are fed in countercurrent through the heat exchanger 1. This results in a good level of efficiency of the heat exchanger used in countercurrent mode and a very low temperature of the exhaust gas when it leaves the heat-transfer-side region 1b of the heat exchanger 1. This exhaust gas can then be released to the environment practically without any further cooling. Consequently, therefore, further components, which would cause pressure losses in the exhaust-gas stream and increased costs for the fuel cell system, can be eliminated. Moreover, the low exhaust-gas temperature downstream of the heat exchanger 1 results in a very good system efficiency, since at least approximately most of the thermal energy contained in the exhaust gas has been utilized in the heat exchanger 1.

Anode and cathode exhaust gases from the fuel cell are fed to the burner 3 for combustion. For this purpose, a mixing device 4 which is outlined in FIG. 1 is indicated upstream of the burner 3, as seen in the direction of flow. The mixing device 4 is supplied with the exhaust gases from the anode region and the cathode region of the fuel cell. The cathode exhaust gas from the fuel cell has a relatively high residual oxygen content, so that it, together with the residues of hydrogen, methanol and, if appropriate, carbon monoxide contained in the anode exhaust gas, can burn in the burner 3. Since the design of the system means that the gases emanating from the anode or cathode region of the fuel cell are in any case under a certain pressure, there is no need for any further delivery devices for supplying the said gases.

In the starting phase of the fuel cell, the fuel cell does not yet supply a sufficient quantity of exhaust gases. Since, however, at this point in time the cathode region of the fuel cell in particular is already exposed to air, the air which is still virtually unused passes as "cathode exhaust gas" to the mixing device 4. For these operating states, the mixing device 4 may optionally also be supplied with a further operating medium, preferably, of course, the hydrocarbon which is already present in the system, in this case in particular methanol ($CH_3OH$). Naturally, this optional supply of methanol is also possible when, on account of certain load conditions of the fuel cell installation, for example at the start of a sudden increase in power, the combustible residues which are present in the anode exhaust gas are temporarily insufficient to generate the required thermal energy in the burner 3.

On account of the possible high temperature in the burner 3, all the substances which are present in the exhaust gases are at least almost completely burnt, so that there is a much lower emission of pollutants compared to other types of installation.

In a preferred embodiment, the burner 3 is designed as a simple thermal burner, allowing a high level of thermal efficiency and simple and inexpensive production compared to a catalytic burner, which would require coating with a catalyst material.

The exhaust gas, after flowing through the heat exchanger 1, then passes into a heat-transfer-side region 5b of a second heat exchanger 5. In this case, a mixture of water and methanol is likewise heated, evaporated and/or superheated in the medium-side region 5a of the heat exchanger 5, this mixture being supplied to the medium-side region 5a of the heat exchanger 5 via a metering device 2'. In order still to have a sufficient quantity of thermal energy available for the heat exchanger 5 in the exhaust gas, in the exemplary embodiment illustrated here the heat exchanger 1 is operated as a co-current heat exchanger. The heat exchanger 5 is operated in countercurrent mode, thus ensuring a particularly low temperature of the exhaust gas on leaving the heat-transfer-side region 5b of the heat exchanger 5. The overall result, once again, is an excellent level of efficiency, since at least approximately most of the thermal energy present in the exhaust gases has been released in the heat exchangers 1 and 5 for heating, evaporating and/or superheating media.

Overall, the structure illustrated in FIG. 1 results in a relatively low thermal load on the material of the two heat exchangers 1, 5 while, at the same time, achieving improved dynamics. This is made possible in particular by the heat exchanger 1, which may for brief periods be operated at very high temperatures, i.e. with a very high evaporator performance, since the exhaust gas can still usefully dissipate the residual temperature remaining in it downstream of the heat exchanger 1 into the heat exchanger 5. The improved dynamics, in combination with a very good cold-starting performance of the installation, in FIG. 1 also results from the fact that the mass and therefore the heat capacity of the heat exchanger 1 is considerably lower than the mass of the heat exchanger 5. Consequently, the heat exchanger 1 can be heated more successfully and more quickly and has improved dynamics. Naturally, therefore, the evaporator 1 can also only transfer a lower evaporation capacity, but this is compensated for by the use of heat exchanger 5, so that the overall system remains able to provide a high evaporation capacity.

In principle, it would also be possible, in the structure shown in FIG. 1, to dispense with the second metering device 2' for the medium-side region 5a of the heat exchanger 5 and for the heat exchanger 5 to be used as a second stage, for example for the superheating of the medium which has evaporated in the heat exchanger 1.

Figure 2:
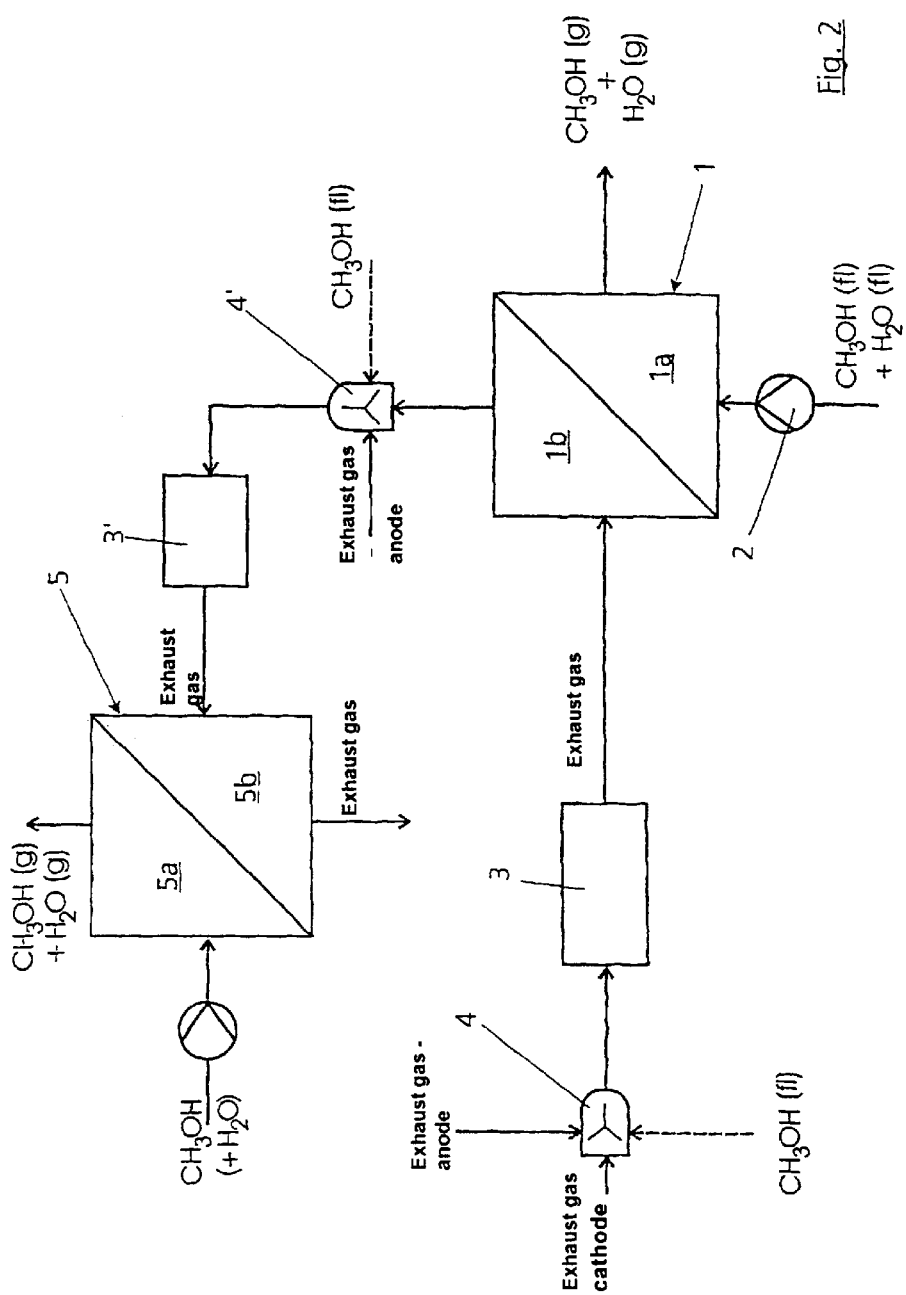
FIG. 2 shows a possible further structure of the device according to the invention, in a structure with two heat exchangers and two burners.

FIG. 2 shows a design of the device, the basic principle of which is similar to the structure which has already been described above.

A heat exchanger 1 with its medium-side region 1a and its heat-transfer-side region 1b functions in the manner which has already been described above. In this case, it is possible for the heat exchanger 1 to be operated in countercurrent mode as well as in co-current mode [as illustrated in FIG. 3]. Downstream of the heat exchanger 1, in a further mixing device 4', anode exhaust gas and, if appropriate, methanol are once again fed to the exhaust gases which are generated by the burner 3 and flow through the heat-transfer-side region 1b of the heat exchanger 1. This mixture of anode exhaust gas and exhaust gas from the burner 3 then passes into a further burner 3'. The exhaust gases from this combustion taking place in the burner 3', which can also be regarded as afterburning, then pass into the heat-transfer-side region 5b of the second heat exchanger 5. In the medium-side region 5a of the second heat exchanger 5, a process which is similar to that on the medium-side region 1a of the heat exchanger 1 takes place. The use of two burners 3, 3' in the overall system enables at least approximately all the combustible residues from the anode and cathode exhaust gases of the fuel cell to be reacted, so that there are very low emissions of pollutants and the efficiency of the overall installation is increased further through the utilization of most of the energy-supplying substances which are contained therein.

In principle, both heat exchangers 1, 5 can be operated in countercurrent mode, so that in this case too the efficiencies of heat transfer become very high. To improve the efficiency of the overall system, however, it is sufficient for the heat exchanger 5 to be operated in countercurrent mode, in order to cool the exhaust gases which leave the system to the lowest possible temperature. Therefore, depending on the desired operation, it is possible in the heat exchanger 1 to choose between co-current or countercurrent mode.

In this arrangement too, the construction of the heat exchanger 1 which has already been outlined with reference to FIG. 1, i.e. the lightweight and simple structure, applies on account of improved dynamics or an improved cold-starting performance. Moreover, as illustrated in the exemplary embodiment, the heat exchangers 1 and 5 can be operated independently of one another or, in an alternative which is not shown, as a two-stage heat exchanger, in which, by way of example, the heat exchanger 1 is utilized as a preliminary evaporator, and the heat exchanger 5 is utilized as a superheater.

In the device illustrated in FIG. 2, an additional improvement to the efficiency can be achieved by evaporating a methanol/water mixture with a slightly higher water content in the heat exchanger 1, while pure methanol is evaporated in the heat exchanger 5. If the two flows of media emanating from the heat exchangers 1, 5 are then mixed, it is in this case possible to reach the required ratio of water to methanol. On account of the lower boiling temperature of methanol, however, the exhaust gas leaving the heat exchanger 5 will be at a lower temperature than if a mixture of methanol and water were evaporated in the heat exchanger 5. The result is a further increase in the system efficiency, since the exhaust gases leaving the heat-transfer-side region 5b of the heat exchanger 5 are at an even lower temperature than if a mixture of water and methanol had been evaporated in the heat exchanger 5.

Naturally, other constructions are also conceivable, and these may, in this case, combine any desired number of heat exchangers 1, 5 with a similar or smaller number of burners 3, 3'.

What is claimed is:

1. A device for evaporating and/or superheating a hydrocarbon or a hydrocarbon/water mixture for a gas generation system of a fuel cell, comprising:

a first heat exchanger having a media-side region through which the hydrocarbon or the hydrocarbon/water mixture flows, wherein the media-side region is in thermally-conductive communication with a heat-transfer-side region of the first heat exchanger;

a burner arranged upstream of the heat-transfer-side region of the heat exchanger, wherein an exhaust gas from the burner flows through the heat-transfer-side region of the first heat exchanger; and at least one second heat exchanger having a media-side region through which the hydrocarbon or the hydrocarbon/water mixture flows, wherein the media-side region is in thermally-conductive communication with a heat-transfer-side region of the second heat exchanger, wherein the exhaust gas stream from the heat-transfer-side region of the first heat exchanger flows through the heat-transfer-side region of the second heat exchanger, wherein the at least one second heat exchanger has a greater mass than the first heat exchanger.

2. A device according to claim 1, further comprising an additional burner between the first heat exchanger and the at least one second heat exchanger.

3. A process for evaporating and/or superheating a hydrocarbon or a hydrocarbon/water mixture for a gas generation system of a fuel cell system, said process comprising:

flowing the hydrocarbon or the hydrocarbon/water mixture through a media-side region of a first heat exchanger that is in thermally-conductive contact with a heat-transfer-side region of the first heat exchanger;

flowing an exhaust gas from a burner located upstream of the heat-transfer-side region of the first heat exchanger through the heat-transfer-side region of the first heat exchanger;

flowing the exhaust gas from the heat-transfer-side region of the first heat exchanger through a second heat exchanger, wherein the at least one second heat exchanger has a greater mass than the first heat exchanger.

4. A process according to claim 3, further comprising feeding anode exhaust gas and cathode exhaust gas from the fuel cell system to the burner for combustion.

5. A process according to claim 3, further comprising feeding a fuel to the burner for combustion.

6. A process according to claim 3, wherein at least approximately complete oxidation occurs in the burner.

7. A process according to claim 3, wherein the exhaust gas and the hydrocarbon or hydrocarbon/water flow through the first heat exchanger countercurrently.

8. A process according to claim 3, further comprising feeding at least one of anode exhaust gas from at the fuel cell or fuel to an additional burner between the first heat exchanger and the at least one second heat exchanger.

9. A process according to claim 5, wherein the fuel is a hydrocarbon.

10. A process according to claim 9, wherein the hydrocarbon is methanol.

* * * * *